United States Patent
Ito

(10) Patent No.: US 9,299,015 B2
(45) Date of Patent: Mar. 29, 2016

(54) NON-TRANSITORY COMPUTER-READABLE RECORDING MEDIUM AND TEMPLATE PROCESSING METHOD

(71) Applicant: BROTHER KOGYO KABUSHIKI KAISHA, Nagoya-shi, Aichi (JP)

(72) Inventor: Chitoshi Ito, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 203 days.

(21) Appl. No.: 14/019,704

(22) Filed: Sep. 6, 2013

(65) Prior Publication Data

US 2014/0092409 A1 Apr. 3, 2014

(30) Foreign Application Priority Data

Sep. 28, 2012 (JP) ................................ 2012-215980

(51) Int. Cl.
  *G06K 15/02* (2006.01)
  *G06F 3/12* (2006.01)
  *B41J 3/407* (2006.01)

(52) U.S. Cl.
  CPC ............ *G06K 15/024* (2013.01); *G06F 3/1204* (2013.01); *G06F 3/1257* (2013.01); *G06F 3/1288* (2013.01); *B41J 3/4075* (2013.01)

(58) Field of Classification Search
  None
  See application file for complete search history.

(56) References Cited

U.S. PATENT DOCUMENTS

| | | | |
|---|---|---|---|
| 5,907,835 A * | 5/1999 | Yokomizo et al. | |
| 8,320,019 B2 | 11/2012 | Namikata et al. | |
| 2006/0193008 A1* | 8/2006 | Osaka et al. | 358/1.18 |
| 2008/0231897 A1* | 9/2008 | Ito | 358/1.15 |
| 2010/0060927 A1* | 3/2010 | Ichikawa et al. | 358/1.15 |
| 2010/0171999 A1* | 7/2010 | Namikata et al. | 358/530 |

FOREIGN PATENT DOCUMENTS

| | | |
|---|---|---|
| JP | 08-147446 | 6/1996 |
| JP | 2010-020468 | 1/2010 |

* cited by examiner

*Primary Examiner* — Mohammad Ghayour
*Assistant Examiner* — Pawandeep Dhingra
(74) *Attorney, Agent, or Firm* — McCarter & English, LLP

(57) ABSTRACT

This disclosure discloses a non-transitory computer-readable recording medium storing a template processing program for executing an editing accepting step, a template producing step, a text main body data acquisition step, and a template transmission step. In the template producing step, a template including at least one the print object is produced. In the search target setting step, a setting whether or not the print object included in the template is set to a key word search target is accepted. In the text main body data acquisition step, text main body data extracted from the print object to be set to the key word search target and expresses text contents of the print object, is acquired. In the template transmission step, the template is transmitted to a template server and stored therein.

4 Claims, 12 Drawing Sheets

FIG. 8

STANDARD NAME AND INTENDED USE CORRESPONDENCE TABLE

| STANDARD NAME | INTENDED USE |
|---|---|
| CODE39 | INDUSTRIAL FIELD |
| UCC/EAN-128 | CIRCULATION, DISTRIBUTION, MEDICAL CARE |
| ITF | CIRCULATION, DISTRIBUTION |
| CODABAR | MAIL, BOOK |
| JAN13 | PRINTED BOOK |
| POSTNET | MAIL |
| DATA MATRIX | ELECTRONIC PART |
| QR CODE | GENERAL |

NON-TRANSITORY COMPUTER-READABLE RECORDING MEDIUM AND TEMPLATE PROCESSING METHOD

CROSS-REFERENCE TO RELATED APPLICATION

The present application claims priority from Japanese Patent Application No. 2012-215980, which was filed on Sep. 28, 2012, the disclosure of which is incorporated herein by reference in its entirety.

BACKGROUND

1. Field

The present disclosure relates to a non-transitory computer-readable recording medium and a template processing method for processing a template which is used for producing a print label.

2. Description of the Related Art

In the case that a print label is produced in a print label producing apparatus, it is very troublesome to manually set all the contents of printed texts per print label. Accordingly, there is generally used a so-called template in which a plurality of layout frames allocated according to a predetermined mode. An operator can easily produce a desired print label by selectively using the templates which are suitable for the operator's self-intended print mode.

Further, in recent years, according to development and popularization of network and cloud computing, a case that the templates are uploaded to an external data base so as to be shared with the other operator is going to be increased. In the case that a lot of templates are uploaded to the data base as mentioned above, it is general to upload each of the templates while associating with a search key corresponding to each of the templates, so that the other operator can easily search a target template in future.

For example, a method of applying metadata (search key word) to PDL data is known. In the PDL data which is one format of document data, image data is included in addition to character code information (text data) which expresses character string as it is. In the prior art, the character code information corresponding to the content is extracted according to a character recognition process on the character string which is expressed as an image on image data, and the character code information is also applied as a search key word to the PDL data.

However, in the templates, there are many cases that data having various contents, forms and formats are included, in addition to the image data which expresses the character string as an image as it is, and the text data which directly encodes the character string. The various data includes a lot of data which cannot be utilized as the search key as it is, even if the data substantially indicates any specific information. Accordingly, it is necessary for the operator to manually input the character string which expresses the data contents as a key word, when uploading the template, thereby causing a low convenience.

SUMMARY

An object of the present disclosure is to provide a non-transitory computer-readable recording medium and a template processing method which can execute uploading of templates in a searchable form, while avoiding a labor load for applying a key word to the templates according to a manual operation.

In order to achieve above-described object, according to the aspect of the application, there is provided a non-transitory computer-readable recording medium storing a template processing program for executing steps on a computer unit of an operation terminal connected to a print label producing apparatus that has a feeder configured to feed a print-receiving medium and a printing head configured to perform desired printing on the print-receiving medium fed by the feeder and that is configured to produce a print label by using a template which is structured such that print objects are allocated according to a predetermined mode, and the operation terminal being connected to a template server for storing the template so as to enable information transmission and reception and including an operation unit and the computer unit, the steps comprising an editing accepting step for accepting an editing operation of the template via the operation unit, a template producing step for producing the template including at least one the print object in response to the editing operation accepted in the editing accepting step, a search target setting step for accepting, via the operation unit, a setting whether or not the at least one print object included in the template produced in the template producing step is set to a key word search target after being stored in the template server, a text main body data acquisition step for acquiring text main body data that is extracted from the print object to be set to the key word search target among the at least one print object included in the template produced in the template producing step, and that expresses text contents of the print object, on the basis of the setting accepted in the search target setting step, and a template transmission step for transmitting to the template server and storing therein the template that is produced in the template producing step, in association with the text main body data that is acquired in the text main body data acquisition step.

In the case that contents processing program of the present disclosure is executed by the computer unit of the operation terminal, the editing operation of the template which the operator carries out via the operation unit is first of all accepted in the editing accepting step. On the basis of the editing operation, the template is produced in the template producing step. The template includes at least one print object, for example, barcode data, text data constituted by character or character string, arrange text data in which the character string is appropriately modified and arranged, or date and time data. The produced template is finally transmitted to the template server in the template transmission step.

Here, the template which is transmitted to the template server as mentioned above is preferably stored in the server in a state in which the template can be searched according to the key word search, for improving a convenience when the template is thereafter used. However, the print object of the completed template is not generally formed as the data which is hit by the above described key word search generally using the text, (even in the case that the print object substantially expresses the contents of the text input by the operator when the editing operation is carried out). Therefore, in order to make the data hit the key word search, it is necessary to impart the text data itself expressing the text contents of the print object independently as a key word to each of the templates.

Accordingly, in the present disclosure, the search target setting step is provided, and accepts the setting of the operator as to whether or not each of the print objects included in the templates is set to the above described key word search target. Subsequently, in the text main body data acquisition step, the text main body data which is extracted from the print object set to the key word search target and expresses the text contents of the print object is acquired. The acquired text main body data is associated with the correspondence template so as to be transmitted to the template server and stored therein, in the above described template transmission step.

As mentioned above, in the present disclosure, when the operator produces the template including at least one print object so as to transmit to the server and store (that is, upload) therein, the text main body data corresponding to the print object is automatically associated with the print object so as to be uploaded. As a result, it is possible to execute the uploading of the template according to the key word searchable form, while avoiding the labor load which imparts the key word to the template according to the manual operation. As a result, it is possible to improve the convenience of the operator.

BRIEF DESCRIPTION OF THE DRAWING

FIG. 8 is a view showing an example of a standard name and intended use correspondence table.

DETAILED DESCRIPTION OF THE PREFERRED EMBODIMENTS

A description will be given below of an embodiment according to the present disclosure with reference to the accompanying drawings.

<System Outline Configuration>

First of all, a description will be given of a whole configuration of a contents information processing system which executes a template processing method according to the present embodiment, with reference to FIGS. 1 and 2.

Figure 1:
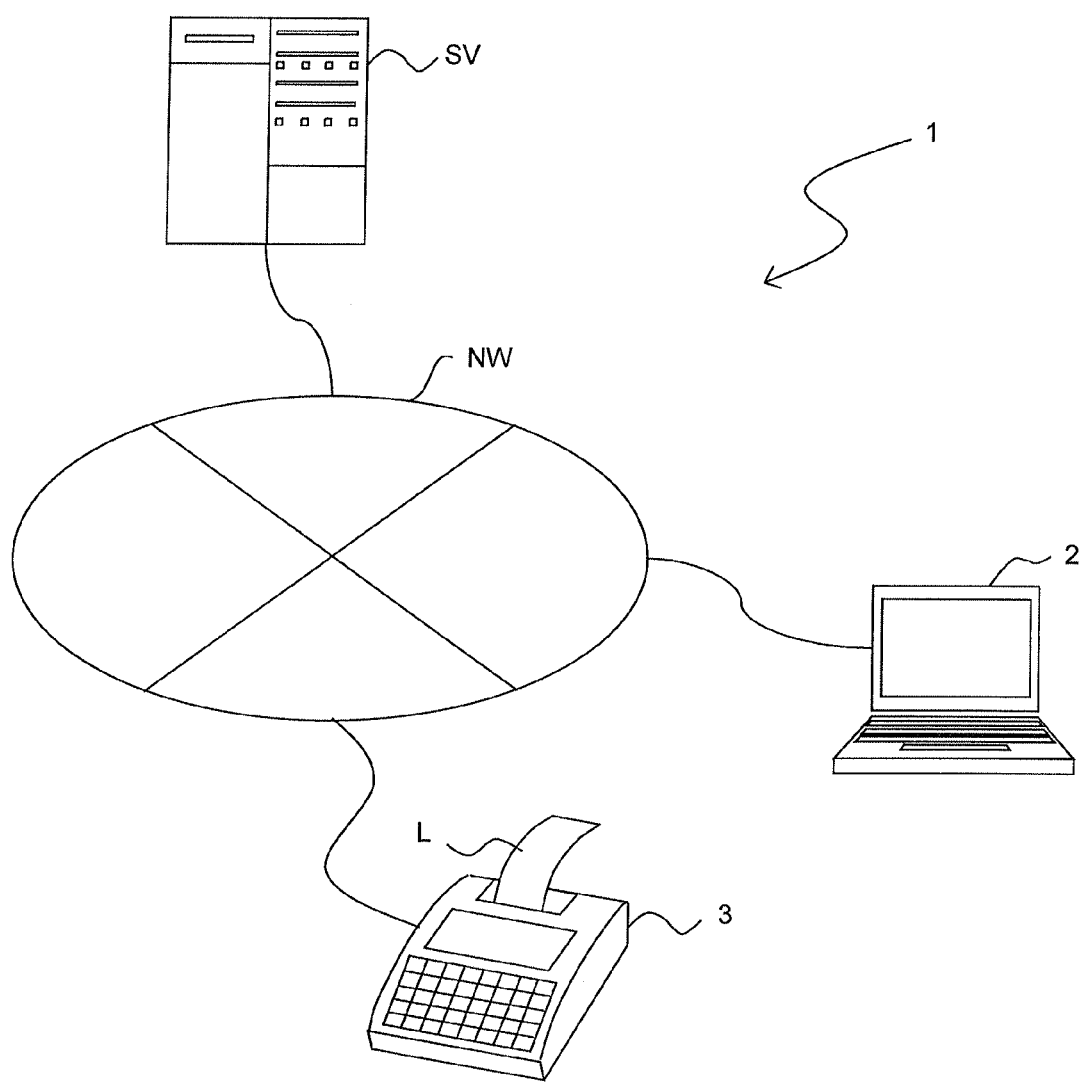
FIG. 1 is a system configuration diagram showing an outline of a contents information processing system which executes a template processing method according to an embodiment of the present disclosure.

In FIG. 1, a contents information processing system 1 has a contents server SV, an operation terminal 2 which is constructed, for example, by a general purpose personal computer, and a label printer 3 which is connected to the operation terminal 2 via an interface, for example, a USB. The contents server SV, the operation terminal 2 and the label printer 3 are connected to each other via a network NW. The label printer 3 transmits and receives various information and instruction signals between the label printer 3 and the operation terminal 2, and produces a print label L which is provided with a desired print of characters and figures on the basis of an operation at the operation terminal 2.

Figure 2:
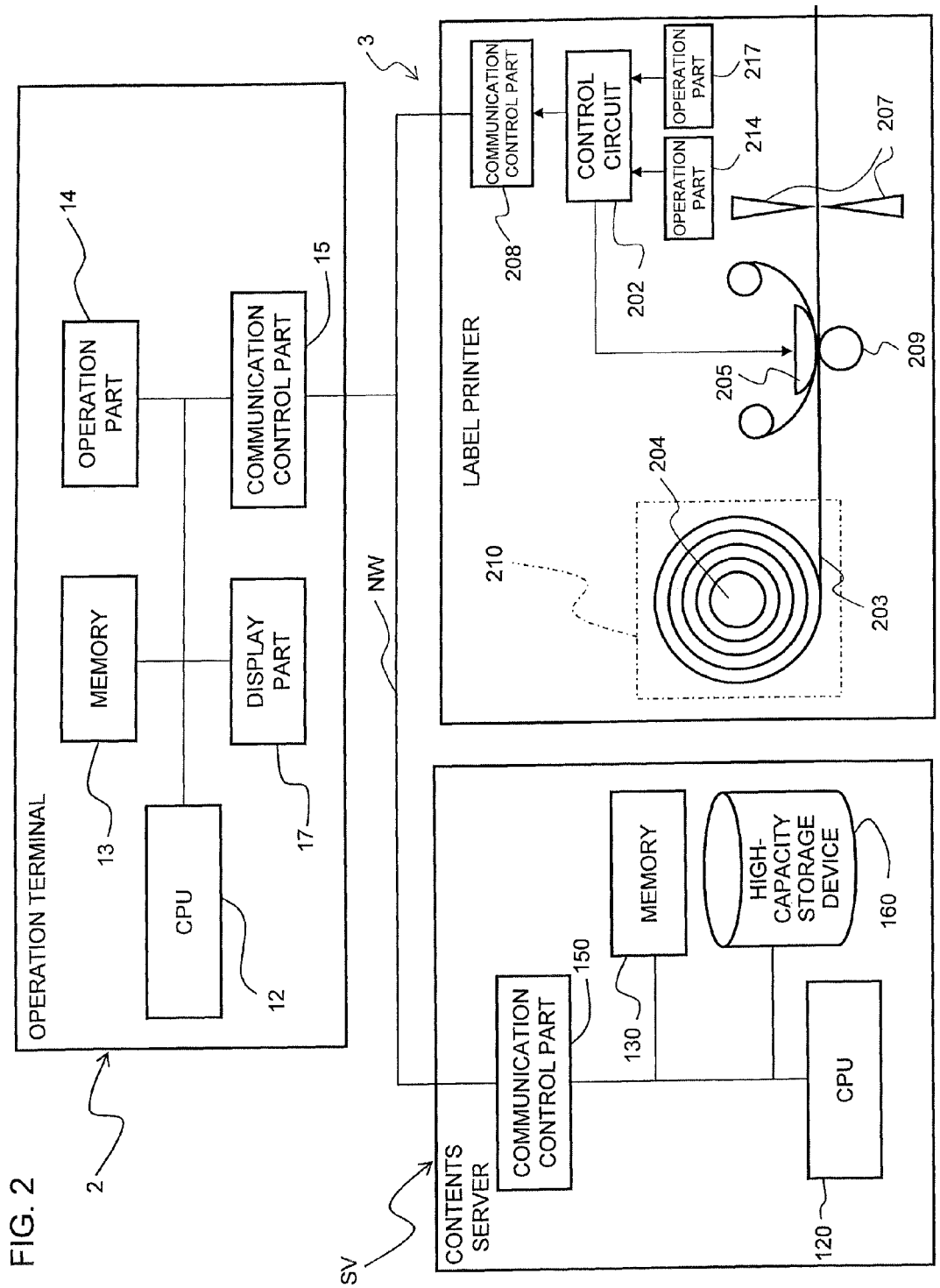
FIG. 2 is a function block diagram showing a detailed function of the contents information processing system.

The operation terminal 2 includes, as shown in FIG. 2, a CPU 12, a memory 13, for example, constructed by a RAM or a ROM, an operation part 14 to which instruction or information is input from a user as an operator, a display part 17 which displays various information and messages, and a communication control part 15 which controls transmission and reception of the information signal with the label printer 3 via the network NW.

The contents server SV includes, as shown in FIG. 2, a CPU 120, a memory 130, for example, constructed by a RAM or a ROM, a communication control part 150 which controls transmission and reception of the information signal with the operation terminal 2 and the label printer 3 via the network NW, and a high-capacity storage device 160 which is constructed by a hard disc device and stores various information.

The CPU 120 and the CPU 12 carry out signal processing according to a program which is previously stored in the ROM while utilizing a temporary storing function of the RAM. The CPU 12 of the operation terminal 2 carries out transmission and reception of the various instruction signals and information signals through the network NW with the label printer 3 and the contents server SV, according to the above described signal processing. The CPU 120 of the contents server SV carries out transmission and reception of the various instruction signals and information signals through the network NW with the operation terminal 2, according to the above described signal processing.

The label printer 3 has a tape roll holder part 210 which can attach and detach a tape roll 204 (or can attach and detach a cartridge having the tape roll 204), the tape roll 204 around which a tape 203 serving is wound (the tape 203 being inherently wound spirally, but, being simplified and shown by a concentric circle), a print head 205 which performs desired printing on the tape 203 fed out of the tape roll 204, a cutter 207 which cuts the tape 203 with print into a predetermined length so as to form a print label L, and a feeding apparatus 209 which is provided so as to face the print head 205 and is controlled by a control circuit 202 so as to feed the tape 203 from the tape roll 204, as shown in FIG. 2. Further, the control circuit 202 carries out input and output of instruction and data with the operator via an operation part 214 and a display part 217. Further, the control circuit 202 is connected to the communication control part 15 of the operation terminal 2 and the communication control part 150 of the contents server SV by the network NW via a communication control part 208, and can transmit and receive the information with the operation terminal 2 and the contents server SV.

<Template and Production of Print Label Using Template>

In the above configuration, in the case that the print label L is produced in the label printer 3, it is very troublesome for the operator to manually set all the contents of the text, image and the like printed on the print label L from the layout to the size in the operation terminal 2. Accordingly, in the present embodiment, there is employed a so-called template in which a plurality layout frames of the above described texts and images is allocated according to a predetermined mode. The operator can easily produce a desired print label L by searching a template suitable for the operator's self-intended print mode from the contents server SV and downloading the template for use. For this purpose, when producing the template with the operation terminal 2 and uploading it to the contents server SV, it is necessary to upload the template together with a search key so that the template can be easily searched. A description will be given in detail below on transmission and reception of the template between the devices.

<As to Transmission and Reception of Template>

Figure 3:
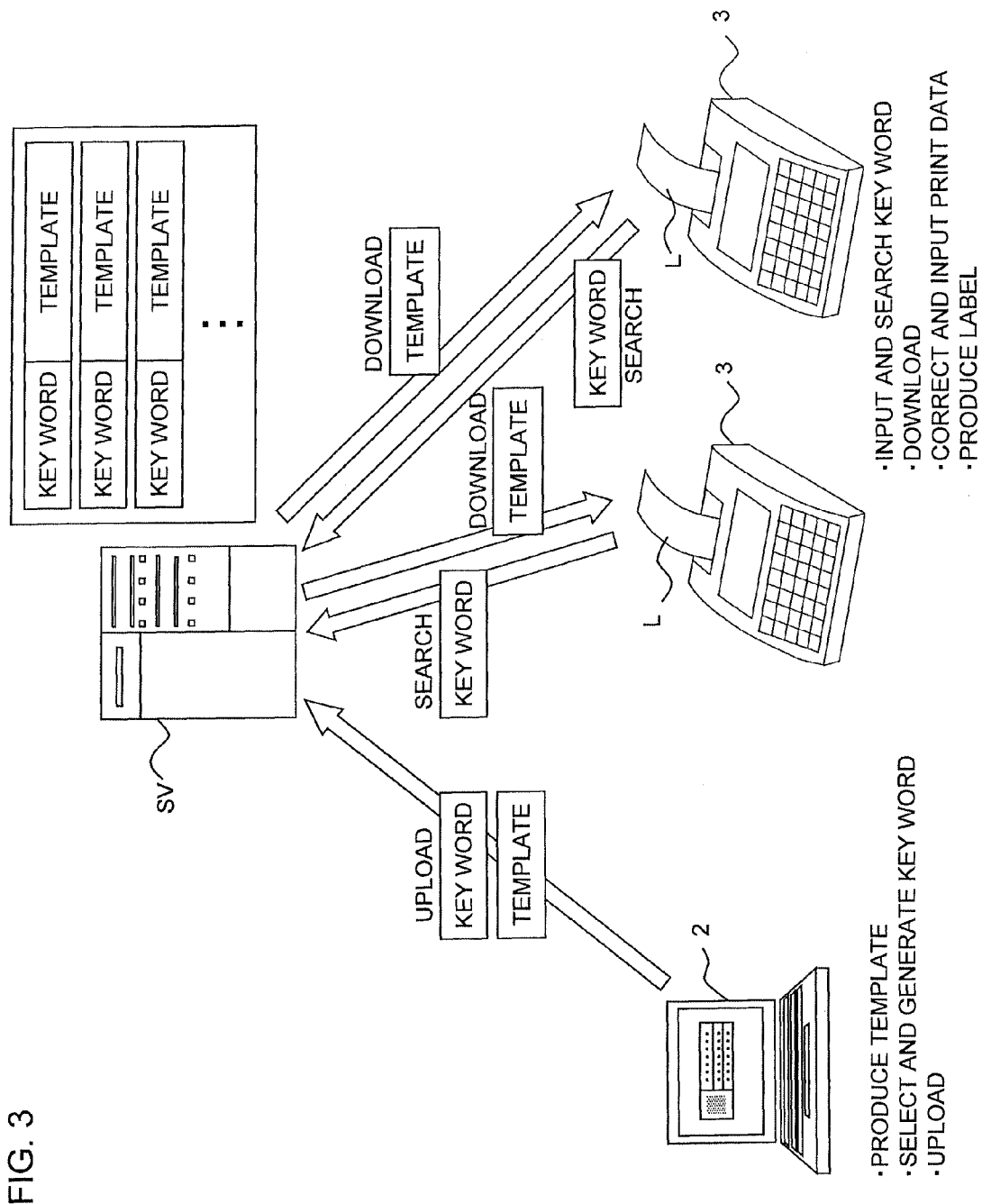
FIG. 3 is a view showing a flow of a template transmission and reception in the content information processing system.

The template is transmitted and received according to a flow as shown in FIG. 3. First of all, the operator operates an application operating on the operation terminal 2, and the template is produced. The produced template is uploaded to the contents server SV and is stored in the above described high-capacity storage device 160. At this time, the search key is applied to the template so as to be uploaded so that the other operator can easily search later as mentioned above.

In an example of the present embodiment, a key word constituted by character string information of a text data format is used as the above described search key. For example, the text data is a combination of three binary data "41, 42 and 43 (hexadecimal expression) encoded by ASCII code which is one kind of character codes, on the character string, for example, which is constituted by three characters "ABC" (the text data will be appropriately abbreviated by "text"). The above described text data may include appropriate header data in addition to the binary data corresponding to the character string. Further, the applied character code may employ, for example, unicode or JIS code in addition to the above described ASCII code, as long as the character code applied between the devices is uniformly or appropriately converted. The contents of the key word described by the text data format desirably reflect the contents of the corresponding template as much as possible.

In the case that the template is produced according to the application of the operation terminal 2, the application creates at least one key word which reflects the contents of the template as mentioned later. The key word which is appropriately selected by the operator among the created key words is applied to the template (associated with the template), and is uploaded to the contents server SV. In the contents server SV, the corresponding template and key word are stored in a state of being associated with each other correspondingly.

On the other hand, in the case that the operator of the label printer 3 searches the template which is suitable for the intended print mode from the contents server SV, the operator inputs the key word corresponding to the intention to the operation part 214 so as to transmit it to the contents server SV. The contents server SV having received the key word for searching searches the template which is associated with the key word and sends a reply to the label printer 3. The transmission and reception of the template at this time is a downloading as seen from a side of the label printer 3. The operator of the label printer 3 can produce a desired print label L by displaying the downloaded template on the display part 217, and appropriately correcting the print data in the template via the operation in the operation part 214.

Feature of Present Embodiment

The template produced and utilized as mentioned above is configured so as to include a plurality of pieces of print data. However, the plurality of pieces of print data frequently includes various data of various data formats, for example, code values based on a predetermined standard, and image data of so-called raster data formats and vector data formats, in addition to the character string data of the text data format mentioned above. The feature of the present embodiment exists in a point that the key word of the text data format is created from the print data of the data formats other than the text data format, among the print data included in the template, in the case that the key word of the template is created and applied by the operation terminal 2. Particularly, in the case that the print data is the image data of the barcode, the standard name of the barcode and the corresponding intended use can be also utilized as the search key. Accordingly, the standard name and the intended use are also created as the key word of the text data format. A description will be given in detail below in order.

<Example of Template>

For example, a description will be given of a case that the key word is created with respect to a template TP in an example shown in FIG. 4. The operator of the operation terminal 2 can produce the template TP as shown by operating a predetermined application. The template TP in the shown example is constituted by five print objects A, B, C, D and E as seen from a shown visual view point. Further, as seen from a view point on the data, the print objects A-E are respectively defined by print data which set individual print forms (layouts, postures, fonts and the like). The print data of the print object A is the image data of a frame line, the print data of the print object B is the image data of the barcode, the print data of the print object C is the text data corresponding to an item "product name", the print data of the print object D is the text data corresponding to an item "asset code", and the print data of the print object E is the date data (in detail mentioned later) corresponding to an item of "producing date".

Figure 4:
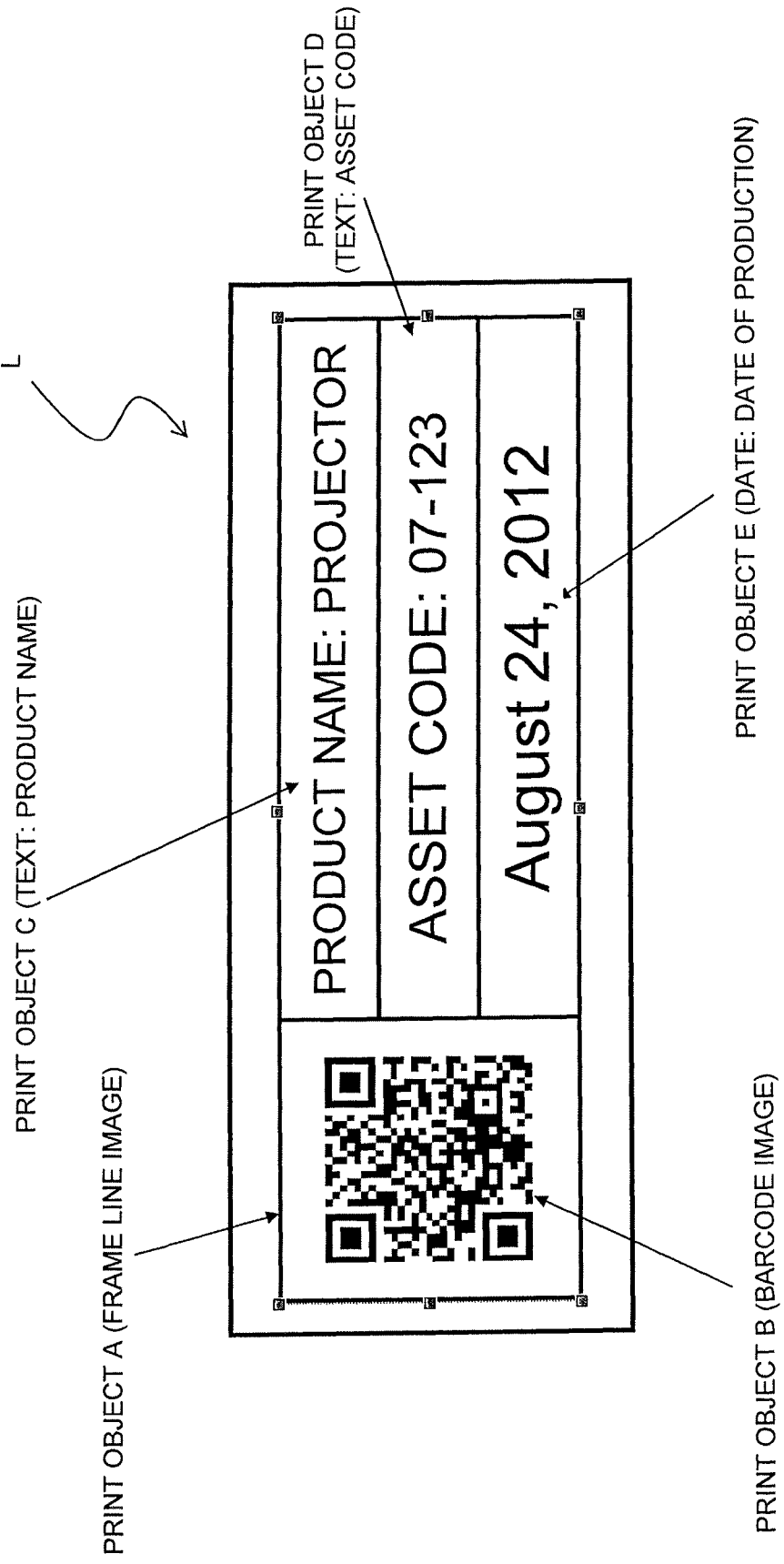
FIG. 4 is a view showing an example of templates.
Figure 5:
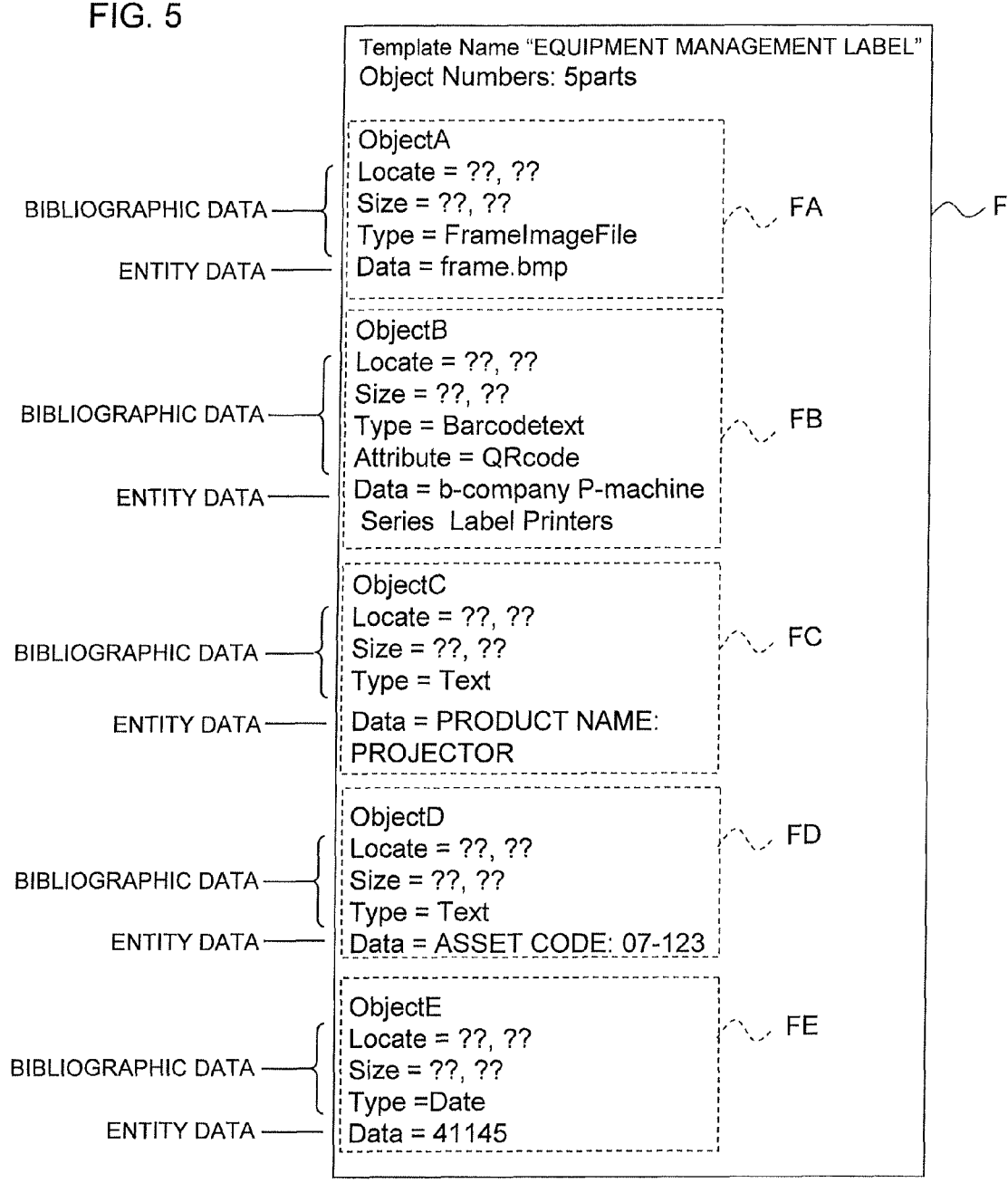
FIG. 5 is an explanatory view showing an example of an arrangement information file which expresses arrangement information of a plurality of print objects corresponding to the template in FIG. 4.

Such data of the template TP is constituted by arrangement information F of each of the print objects, for example, schematically shown by FIG. 5. The print object arrangement information F corresponds to the template TP in the above described FIG. 4 titled by "equipment management label". The arrangement information F includes print data FA, FB, FC, FD and FE which respectively correspond to five print objects A-E.

The print data FA, FB, FC, FD and FE respectively include print object names "Object A"-"Object E" of the corresponding print object A-E, position information "Locate" in the case that the print objects A-E are arranged, size information "Size" in the case that the print objects A-E are arranged, attribute information "Type" of the print objects A-E, and data contents "Data". As mentioned later, only the print data FB corresponding to the image data of the barcode also includes standard information "Attribute". Among them, the identification information, the position information, the size information, and the attribute information (and the standard information) are collectively called as bibliographic data, and the data contents itself is called as entity data. In the drawing, the position information and the size information of each of the print objects are abbreviated by "??" in place of specific numerical values.

The print data FA corresponds to the image data of the frame line of the above described print object A, and includes the bibliographic data which is constituted by the above described identification information constituted by the character string of "Object A", the above described position information expressed by a coordinate on a paper surface of the print label L on the basis of an appropriate unit setting, the above described size information expressed by an appropriate unit setting, and the above described attribute information expressing that the entity data is the image data of the frame line, and the above described entity data (refer to FIG. 4 with regard to the frame line image of the contents) which is expressed by a file name "flame.bmp". To the image data of the frame line constituted by a simple combination of figures, not only the raster data format (.bmp, .jpg, .png) mentioned above but also the vector data format (.dxf, .svg) can be applied.

The print data Fb corresponds to the image data of the barcode of the above described print object B, and includes the bibliographic date constituted by the above described identification information which is constituted by the character string of "Object B", the above described position information which is expressed by the coordinate on the paper surface of the print label L according to an appropriate unit setting, the above described size information which is expressed according to an appropriate unit setting, the above described attribute information which expresses that the entity data is the text data meaning the contents of the barcode, and the above described standard information which expresses that the standard of the barcode is a QR code (registered trade mark), and the above described entity data which is the text data corresponding to the character string of "b-company P-machine Series Label Printers" (refer to FIG. 4 with regard to the encoded barcode image).

The print data FC corresponds to the text data of the item "product name" in the above described print object C, and includes the bibliographic data constituted by the above described identification information which is constituted by the character string of "Object C", the above described position information which is expressed by the coordinate on the paper surface of the print label L according to an appropriate unit setting, the above described size information which is expressed according to an appropriate unit setting, and the above described attribute information which expresses that the entity data is the text data, and the above described entity data which is the text data corresponding to the character string of "product name: projector".

The print data FD corresponds to the text data of the item "asset code" in the above described print object D, and includes the bibliographic data constituted by the above described identification information which is constituted by the character string of "Object D", the above described position information which is expressed by the coordinate on the paper surface of the print label L according to an appropriate unit setting, the above described size information which is expressed according to an appropriate unit setting, and the above described attribute information which expresses that the entity data is the text data, and the above described entity data which is the text data corresponding to the character string of "asset code: 07-123".

The print data FE corresponds to the date data of the item "producing date" in the above described print object E, and includes the bibliographic data constituted by the above described identification information which is constituted by the character string of "Object E", the above described position information which is expressed by the coordinate on the paper surface of the print label L according to an appropriate unit setting, the above described size information which is expressed according to an appropriate unit setting, and the above described attribute information which expresses that the entity data is the date data described by a numerical value expression expressing an actual date in conformity to a predetermined code standard, and the above described entity data which is an integer "41145". In this example, the entity data of the date data is stored as the integer, but, the corresponding date of Japanese calendar or year of grace may be stored by the text data directly expressed by the character string, in addition to the above. One template TP is created from the arrangement information F of the print data as mentioned above.

<Creating Method of Key Word>

A description will be given here of a method of creating the key word which is applied to the template TP. As mentioned above, in the case that the template TP is uploaded to the contents server SV, it is desirable to apply the key word which reflects the contents of the template TP as much as possible. Accordingly, there can be thought a way that the contents of the entity data of the print data constituting the template TP are applied as the key word.

However, as mentioned above, since the key word is limited to the character string information of the text data format, certain problems are generated. In other words, in the case of the above described print objects B, C and D, the entity data of them can be applied as the key word as it is since the entity data is the text data. However, in the case of the other print objects A and E, the entity data of them cannot be applied as the key word as it is since the entity data is the image data or the date data.

Accordingly, in the present embodiment, in the case that the entity data of each of the print data is the text data when creating the key word of the template TP, the entity data is applied as the key word as it is. On the other hand, even in the case that the entity data is the data other than the text data, some text data is applied as the key word by extracting some text data reflecting the contents. In other words, whatever data format the entity data of each of the print data is, the key word is created according to the text data format uniformly from the entity data.

Particularly, since the barcode is generally the image data obtained by encoding specific information which can be expressed by the character string according to a predetermined barcode standard, the substantially expressed specific information described above can be extracted as the key word of the text data format by reverse coding (decoding) the barcode. Further, since a fixed correspondence relationship exists between the kind of the barcode standard used for encoding and the standard name, and a general intended use (a kind of business or a field of the utilization), it is useful to create and utilize also the standard name or the intended use as the key word.

Further, all the entity data included in the template TP is not created as the key word, but only the print data (the entity data) which is determined by the operator to be useful for the search key is optionally selected and applied to the key word.

<Specific Example of Key Word Creating Process According to Present Embodiment>

Figure 6:
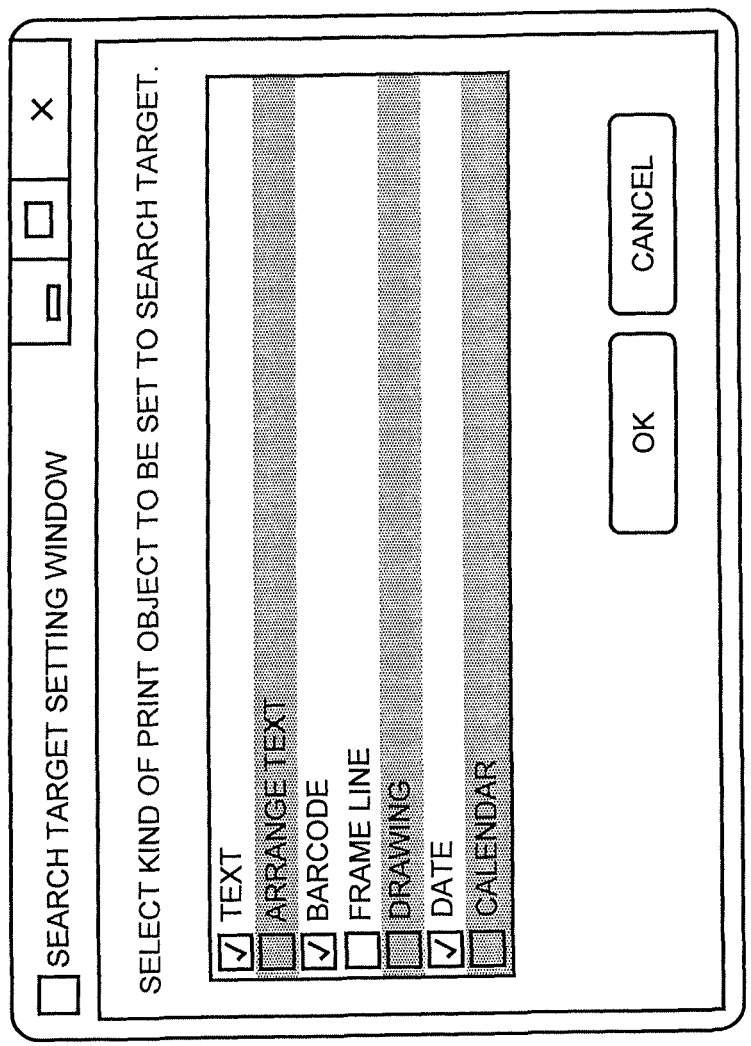
FIG. 6 is a view showing a display example of a search target setting window.

A description will be given of a specific example of a key word creating process according to the method mentioned above. After producing the template TP shown in the above described FIG. 4 according to the predetermined application on the operation terminal 2, the application next displays a search target setting window as shown in FIG. 6. In the search target setting window, names of the kinds of all the print objects which can constitute the template TP, that is, text, arrangement text, barcode, frame line, drawing, date, and calendar are listed up.

The text is the print object constituted by the character string data which is encoded by the predetermined character code as mentioned above. The arrangement text is the print object (not shown) constituted by an expansion type text data which in detail sets specific layout, posture, size and font per each of the characters of the text. The barcode is the print object constituted by the image data which encodes the specific information which can be expressed generally by the character string according to the predetermined barcode standard as mentioned above. The frame line is the print object constituted by the image data which is expressed by aggregate of segments and geometrical figures arranged according to a predetermined mode. The drawing is the print object which is constituted by the image data of an optional content. The date is the print object which is constituted by the date data expressing the date on which the template TP is produced. The calendar is the print object which is constituted by the expansion type date data obtained by further adding the information of day of the week to the date data. Further, a radio box for individually setting each of the print objects is displayed at a left end position of the kind name of each of the print objects.

Since only the print objects of the text, the barcode, the frame line and the date are included in the template TP shown in the above described FIG. 4, among the kinds of the print objects, only the radio boxes of them can be effectively operated to be input. However, hatching meaning that the object is not included in the template TP and is not the target is superposed on the names of kind of the other print objects (the arrangement text, the drawing, and the calendar of the shown example), and the operating function to the radio boxes corresponding to them is made ineffectual. The names of kind of the print objects which are not the target may not be displayed from the beginning and only the names of kind of the print objects included in the template TP may be listed up. The operator applies a setting operation (an input operation of an illustrated check mark) to the radio box of at least one print object of which the kind of the entity data is deemed to be suitable for the key word, in the search target setting window, and sets the search target (sets the text, the bard code and the date in the shown example).

After the end of the setting operation of the search target, the application internally creates the key word on the basis of the setting. The application extracts the key word uniformly from the entity data of the print object set to the search target according to the text data format. Here, a specific programming method (or program configuration) of the key word creating process program includes a case of programming so as to create all the key words in a lump according to a main program, and a case of programming so as to create the key word in each of the print objects themselves according to a so-called object oriented program. In the present embodiment, a description will be given of the case of programming according to the object oriented program.

Figure 7:
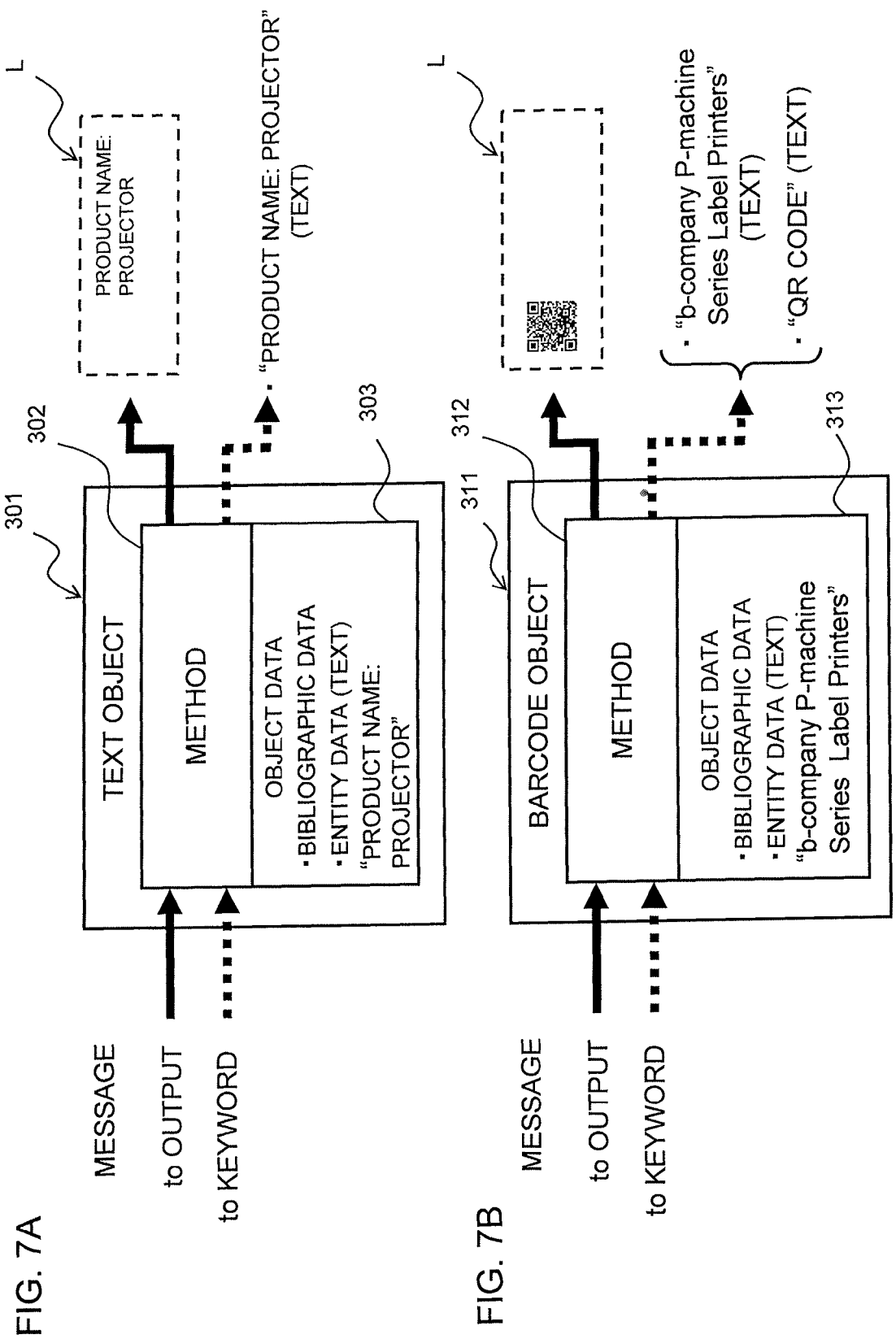
FIG. 7A is a view describing creation of a print dot pattern and a key word by an object oriented print object, and describes a case of a text object.
FIG. 7B is a view describing creation of a print dot pattern and a key word by an object oriented print object, and describes a case of a barcode object.

For example, FIG. 7A shows a relationship between the input information and the output information in the case that the print object C in the above described FIG. 5 is constituted as one instance (object as seen from the view of the programming). Since the attribute information of the print object C indicates that the entity data is the text data, the instance of the print object C is a text object 301 in the view point of the programming. The instance of the text object 301 is provided with a so-called method 302 corresponding to a program which the CPU 12 of the operation terminal 2 and the control circuit of the label printer 3 can execute, in conjunction with the same object data 303 as the print data (the bibliographic data and the entity data) shown in the above described FIG. 5.

In the case that the label printer 3 deals with the text object 301, "toOUTPUT" outputting a print dot pattern as a message corresponding to a processing instruction is input to the method 302 of the text object. The text object 301 to which the message of "toOUTPUT" is input outputs a print dot pattern for printing the text data "product name: projector" (refer to the entity data) according to the predetermined layout and size (refer to the bibliographic data) in the coordinate on the paper surface of the print label L, with reference to the object data 303 by the method 302 (refer to a heavy line flow in the drawing). The label printer 3 can print the template TP shown in the above described FIG. 4, by superposing the print dot pattern which each of the print objects A-E outputs. Further, the operator of the label printer 3 can produce the print label L of the intended contents while utilizing the bibliographic data as it is, by optionally changing the entity data.

Further, in that case that the key word is created according to the application on the operation terminal 2, a message "toKEY WORD" for outputting the key word is input to the method 302 of the text object 301. The text object 301 to which the message "toKEY WORD" is input outputs the text data "product name: projector" with reference to the entity data of the object data 303 by the method 302 (refer to a dotted line flow in the drawing). Since the entity data is the text data originally in this case, the entity data may be output as the key word as it is.

As mentioned above, each of the print objects A-E in the template TP is constituted as an object which carries out a data processing uniquely in the view point of the programming. Further, in the case of the present embodiment, the method of the object is provided with two functions including a function of outputting the print dot pattern, and a function of outputting the key word of the text data format.

Next, FIG. 7B shows a relationship between the input information and the output information in the case that the print object B in the above described FIG. 5 is set as a so-called one instance. Since the attribute information of the print object B indicates that the entity data is the text data meaning the contents of the barcode, the instance of the print object B becomes a barcode object 311.

In the case that the label printer 3 deals with the barcode object 311, a message "toOUTPUT" for outputting the print dot pattern is input to a method 312 of the barcode object 311. The barcode object 311 to which the message "toOUTPUT" is input outputs a print dot pattern which prints the image data obtained by encoding the text of the entity data according to a barcode standard (a QR code (registered trade mark) in this example) of the standard information, according to the predetermined layout and size in the coordinate on the paper surface of the print label L, with reference to the object data 313 by the method 312 (refer to a heavy line flow in the drawing). The operator of the label printer 3 can produce the print label L of the intended contents while utilizing the bibliographic data as it is, by optionally changing the text data of the contents of the barcode which is the entity data.

Further, in the case that the key word is created according to the application on the operation terminal 2, a message "toKEY WORD" for outputting the key word is input to the method 312 of the barcode object 311. The barcode object 311 to which the message "toKEY WORD" is input outputs text data of "b-company P-machine Series Label Printers" and "QR code" with reference to the entity data of the object data 313 and the standard information by the method 312 (refer to a dotted line flow in the drawing). In this case, the barcode shown in the above described FIGS. 4, 7A and 7B is obtained by encoding the text data expressed by the character string information of "b-company P-machine Series Label Printers" according to the barcode standard of the QR code. Accordingly, since the entity data is originally constituted by the text data, the entity data can be output as the key word as it is, and the contents of the standard information can be also output as the key word by being converted into the text data of the corresponding character string information.

In the case that the key word is output to the object having the entity data other than the text as mentioned above, the method applies an analysis, for example, the reverse coding, to the contents of the entity data, and outputs the appropriate character string information corresponding to the contents as the key word of the text data format.

Further, in the present embodiment, in the case that the standard name of the barcode standard is extracted from the barcode object 311, the intended use corresponding to the standard name is also acquired. For example, as shown in FIG. 8, the barcode has a lot of standards, and the respective standards are generally different in their generally utilized kind of business and field. Such the correspondence relationship can be stored as a standard name and intended use correspondence table in a high-capacity storage device 160 of the operation terminal 2, and the intended use (kind of business and field) of the template TP can be acquired on the basis of the standard name which is extracted from the barcode object 311. In the example of the present embodiment, the shown standard name and intended use correspondence table is provided on the application side of the operation terminal 2, and the process of acquiring the key word for the intended use is carried out by the application. However, the configuration is not limited to this, the standard name and intended use correspondence table may be stored by the method 312 itself of the barcode object 311, and the key word of the intended use may be output.

Figure 9:
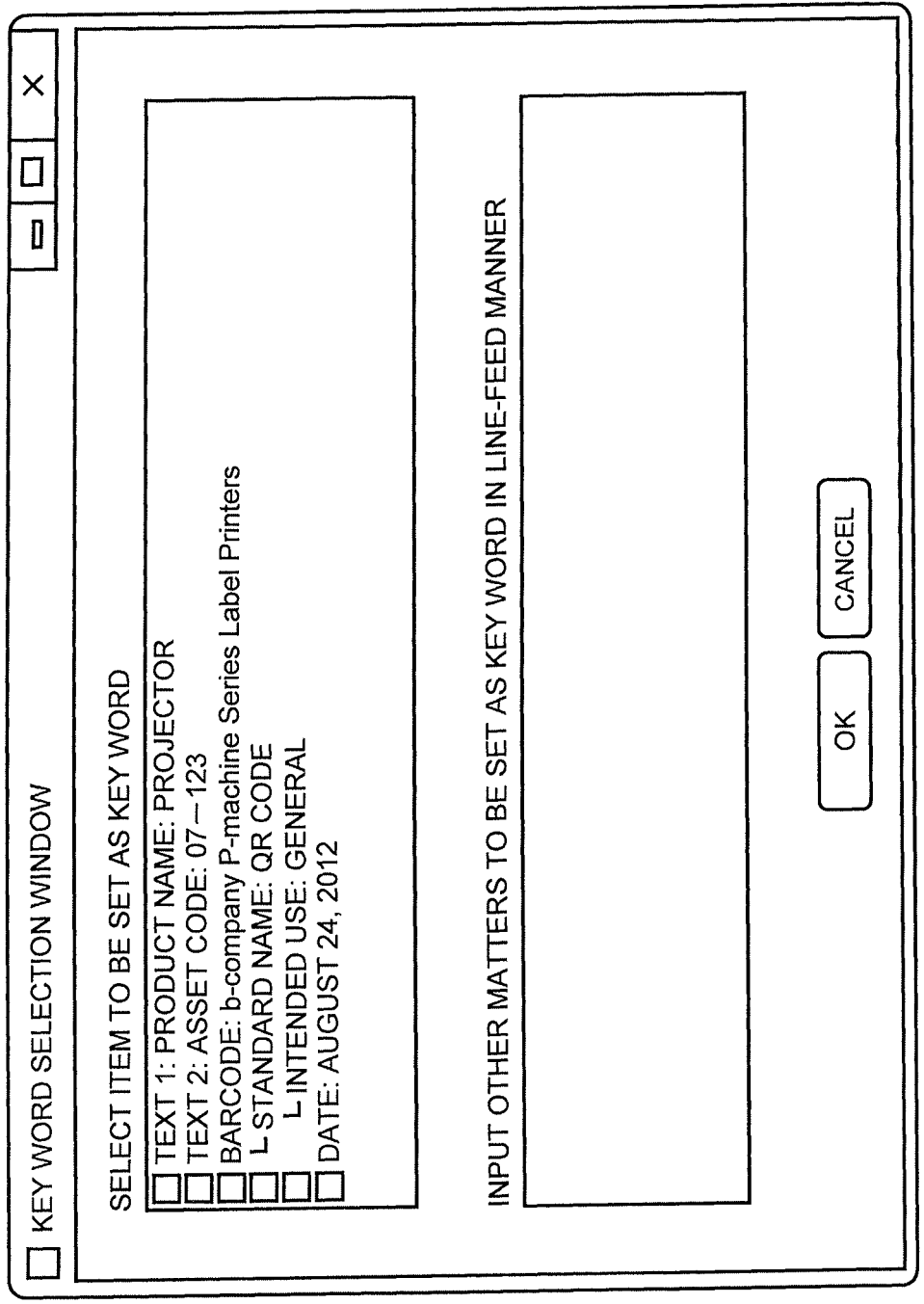
FIG. 9 is a view showing a display example of a key word selection window.

As mentioned above, after the application of the operation terminal 2 extracts and creates the key word, the application displays the key word selection window as shown in FIG. 9. The key word created from the print object of the kind which is set to the search target by the search target setting window in the above described FIG. 6 is listed up in the key word selection window.

Specifically, on the basis that the print object of the text is set as the search target, the key words "product name: projector (text 1)" and "asset code: 07-123 (text 2)" are created and listed up respectively from the print objects C and D in which the entity data is the text data. Further, on the basis that the print object of the barcode is also set as the search target, the key word "b-company P-machine Series Label Printer (barcode)" is created and listed up from the print object B in which the entity data is the image data of the barcode. Further, in the case of the barcode, "QR code" corresponding to the standard name and "general" corresponding to the intended use are also created and listed up as the key word. Further, on the basis that the print object of the date is set as the search target, the key word "Aug. 24, 2012 (date)" is created and listed up from the print object E in which the entity data is the date data.

Figure 10:
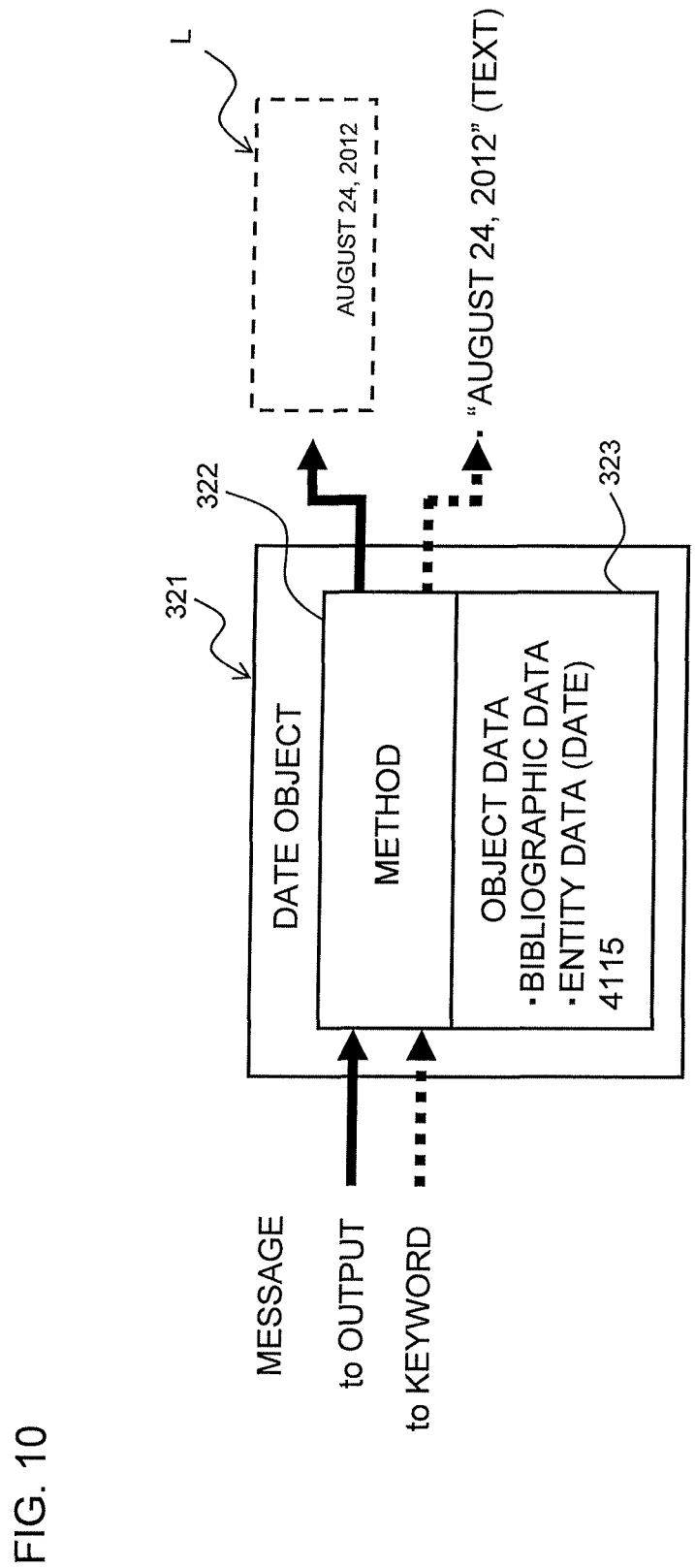
FIG. 10 is a view describing creation of a print dot pattern and a key word according to an object oriented date object.

With regard to the key word of the date, the print object E may be constituted as an object oriented instance 321 as seen from the view point of the programming, and a method 322 may output as a key word of the date, as shown in FIG. 10. In this case, a method to which a message "toKEY WORD" is input refers to entity data ("41145" in the shown example) which is described by an integer in conformity to a predetermined code standard included in object data 323 so as to convert it into a predetermined mode, for example, Japanese calendar/year of grace, and outputs the character string information expressing the date as the key word of the text data format.

Further, although not shown, in the case of creating the key word of the frame line, for example, the method of the instance performs image recognition analysis or data analysis on the image data (raster/vector format) of the frame line which is the entity data. As a result, the character string information expressing the substantial configuration (for example, "left end barcode three stage character string") of the frame line or a previously defined classification (for example, "type 1" and "type 2") may be created, and the text data thereof may be output as the key word.

Further, the operator selects the key word which is finally applied to the template TP, by individually performing the setting operation on the radio box which is displayed at a left end position of each of the key words. As a result, the application of the operation terminal 2 applies only the selected key word to the template TP so as to upload it to the contents server SV.

<Control Procedure>

Figure 11:
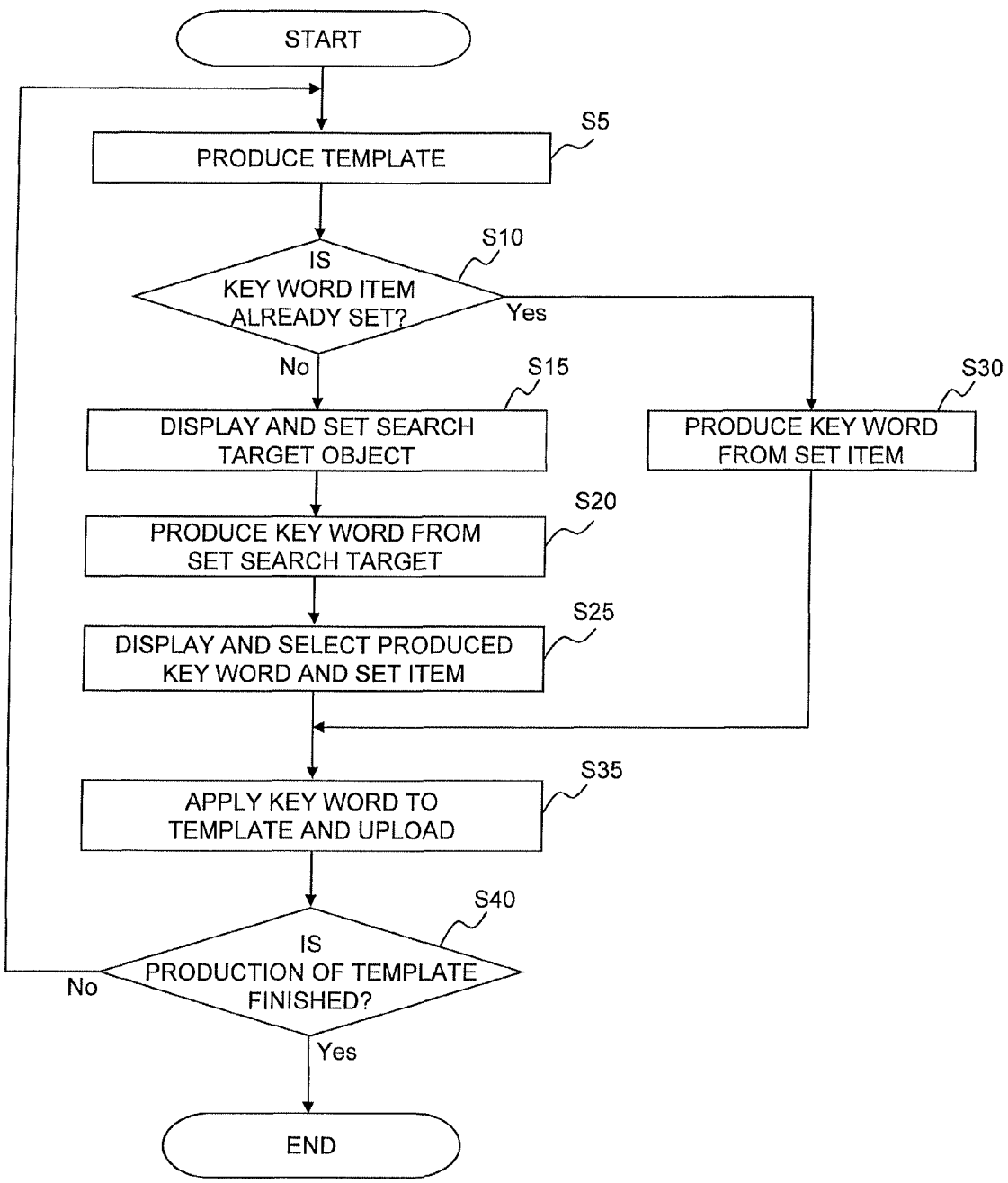
FIG. 11 is a flow chart showing a control procedure to be executed by a CPU of an operation terminal.

FIG. 11 shows a control procedure of the template processing method according to the present embodiment which the CPU 12 of the operation terminal 2 executes according to the template processing program (application) stored in the memory 13 in order to execute the template processing method according to the method mentioned above.

First of all, in step S5, the CPU 12 produces the template on the basis of the operation instruction which is input, for example, from the operator via the operation part 14. As a specific producing work of the template in the step S5, there are a newly producing work in which the template is produced absolutely newly only for the first time, and an editing work in which the existing template is only partly changed after the second time which is repeatedly carried out as mentioned later (the number and the kind of the included print objects are unchanged).

Subsequently, in step S10, the CPU 12 determines whether or not the key word item has been already set. In other words, the CPU 12 determines whether or not the item indicating from what entity data (or standard name or intended use) of the print object the key word to be finally applied to the template produced in the above described step S5 is created has been already set. In the case that the key word item has not been set yet, the determination is not satisfied, and the process goes to step S15.

In step S15, the CPU 12 displays the kind name of the print object included in the template in the display part 17 as a list by the search target setting window in the above described FIG. 6, and allows the operator to input and set what kind of print object is set to the search target.

Subsequently, in step S20, the CPU 12 creates the key word from the entity data of the print object of the search target which is set in the above described step S15. As mentioned above, in the example according to the present embodiment, in the view point of the programming, all the print objects are constituted as the instance, and the key word of the text data reflecting the contents of the entity data is extracted by inputting the predetermined message to the method of the search target among the print objects. Further, particularly in the barcode object, the method also extracts the standard name of the barcode standard, and the main program acquires the intended use corresponding to the standard name by referring to the standard name and intended use correspondence table in the above described FIG. 8.

Subsequently, in step S25, the CPU 12 displays the key word created in the above described step S20 on the display part 17 as a list in the key word selection window in the above described FIG. 9, and allows the operator to input and set which key word is applied to the template. In other words, the CPU 12 allows the operator to set the key word item. Then, the process goes to the next step S35.

On the other hand, in the case that all the key word items have been already set in the determination in the above described step S10, the determination is satisfied, and the process goes to a step S30.

In the step S30, the CPU 12 creates the key word from the entity data of the print object corresponding to the key word item which has been already set. Further, the CPU 12 particularly extracts also the standard name from the barcode object and acquires the corresponding intended use. Then, the process goes to the next step S35.

In step S35, the CPU 12 applies the key word which is selected in the above described step S25, or the key word which is created in the above described step S30 to the template, and uploads it to the contents server SV.

Subsequently, in step S40, the CPU 12 determines whether or not the instruction of finishing the production of the template is input from the operator via the operation part 14. In the case that the instruction of finishing the production of the template is input, the determination is satisfied, and the flow is finished.

On the other hand, in the case that the instruction of continuing the production of the template is input, the determination is not satisfied, and the process goes back to the above described step S5, and the same procedures are repeated. In the case that the production of the template is the second time or after, the producing work is carried out by the editing work which changes only a part of the most recently produced template while keeping the number and the kind of the included print objects. In the case that it is intended to produce a plurality of absolutely new templates, it is necessary to redo the work from the start of the application every time.

As described above, the present embodiment executes the procedure in step S15, and accepts the operator's setting whether or not each of the print objects included in the template should be set to the key word search target. Subsequently, according to the procedure of step S20, the key word of the text data format which is extracted from the print object set to the key word search target and expresses the entity data contents of the print object is acquired. Then, the acquired key word of the text data format is associated with the corresponding template so as to be transmitted to the contents server SV, and is stored, in the procedure of step S35.

As mentioned above, in the present embodiment, in the case that the operator produces the template including at least one print object so as to transmit it to the contents server SV and store it (that is, upload), the key word of the text data format corresponding to the entity data of the print object is automatically associated and uploaded. As a result, it is possible to execute the upload of the template in the key word searchable form while avoiding the labor load for applying the key word to the template according to the manual operation. As a result, it is possible to improve the convenience of the operator.

Further, in the present embodiment, particularly, the key word of the text data format is selectably displayed on the display part 17 according to the procedure in step S25, and the selection operation of the key word via the operation part 14 by the operator is accepted on the basis of the display. As a result, in the case that the key word of the text data format is acquired from the print object, the operator can visually recognize the contents of the key word. Further, in the case that a plurality of key words is acquired, the operator can select a part (or all) of the key words to be set to the upload target on the basis of the operator's own intension. As a result, it is possible to further improve the convenience.

Further, in the present embodiment, particularly, in the case that a plurality of templates is produced, the procedure in step S5 is individually executed on each of the plurality of templates, and the setting of the search target according to the procedure of step S15 is executed only on the first template which is first produced among the plurality of templates. Further, in the procedures in step S20 and step S30, the key word extracted from the print object to be set to the search target is acquired with regard to each of the plurality of templates, on the basis of the setting of the search target according to the procedure of step S15 which is executed only on the first one template.

As a result, the same setting is not necessary in the case that the remaining templates are produced, as long as the operator sets the print object to be set to the search target at the producing time of the first one template in the case that a plurality of templates is produced. As a result, it is possible to lighten the operation load, and it is possible to further improve the convenience.

In the above described embodiment, the description is given of the object oriented case as the specific programming method (or program configuration) of the key word creation processing program in the application, but, the present disclosure is not limited to this. In addition, the programming may be made so that the key words of all the print objects may be created in a lump on the main program side of the application.

Further, in the above described embodiment, the text data, the standard name and the intended use are set as the key word by extracting the text data and the standard name from the image data corresponding to the entity data of the barcode object, and further acquiring the intended use corresponding to the standard name. In the same manner, the key word of the text data format may be extracted by image recognizing the image data corresponding to the entity data of the object of the drawing (refer to FIG. 6) by means of an OCR, and reading the character string information or the figure which the image substantially expresses. For example, in the case that the fact that the image is a simple and characteristic known figure, for example, a national flag or a logo mark is read on the basis of the image recognition, the character string information expressing the recognized contents may be acquired and the text data may be extracted as the key word.

The present disclosure is not limited to the above described embodiment, but can be variously modified within the scope which does not deflect from the spirit and the technical concept. A description will be given below of the modified examples in order.

Figure 12:
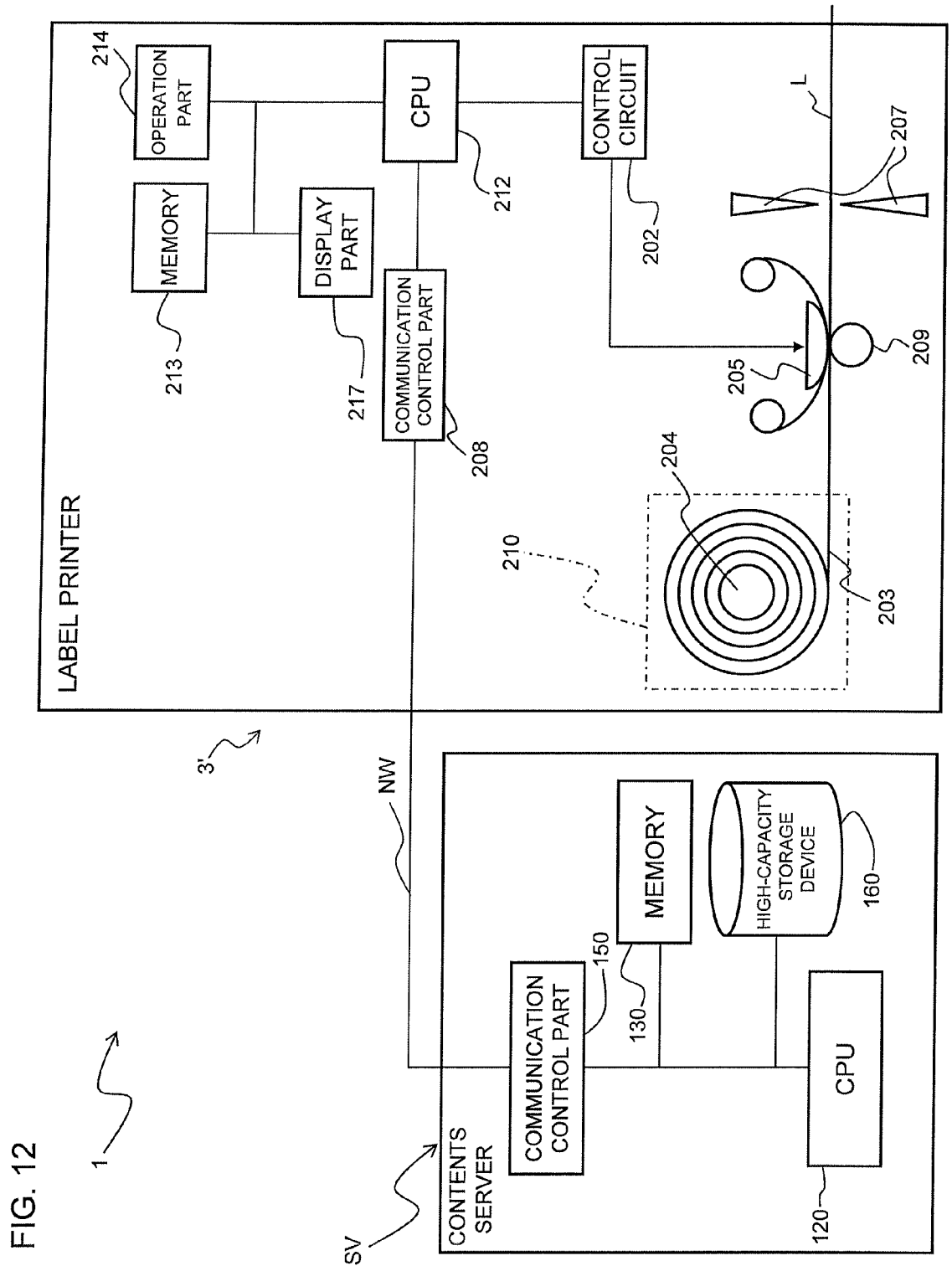
FIG. 12 is a function block diagram of a modified example in which a label printer has also a function of an operation terminal.

(1) Case that the Label Printer Doubles as the Function of the Operation Terminal The functional configuration in the present modified example corresponding to the above described FIG. 2 is shown in FIG. 12. As shown in FIG. 12, in the present modified example, a label printer 3' has a CPU 212, a memory 213, an operation part 214 and a display part 217, which respectively have the same functions as those of the CPU 12, the memory 13, the operation part 14 and the display part 17 in the operation terminal 2 in FIG. 2.

In the present modified example, the same procedures as those in the flow in the above described FIG. 10 are carried out on the basis of an execution of a template processing program which is stored in the memory 213 of the label printer 3' by means of the CPU 212. In other words, in the same manner as the procedures according to the template processing program of the above described embodiment, the operator produces the template including at least one print object via the operation part 214 of the label printer 3' so as to transmit it to the contents server SV and store it (that is, upload). At this time, the key word of the text data format corresponding to the entity data of the print object is automatically associated and uploaded.

Also, in the present modified example, in the same manner as the above described embodiment, it is possible to execute the upload of the template in the key word searchable form, while avoiding the labor load for applying the key word to the template according to the manual operation. As a result, it is possible to improve the convenience of the operator.

In the above, the description is given by exemplifying the case that the print label L is produced by printing the tape 203 corresponding to the print-receiving medium which is fed out from the tape roll 204 and cutting the tape, by the label printer 3 or 3', but, the print label L may be produced by printing a base tape and a cover film which is different from the base tape, and using a tape obtained by bonding the base tape and the cover film, without being limited to the above configuration.

In the above, the arrows shown in each of FIGS. 1, 2, 12 and the like show an example of the signal flows, and do not limit the signal flowing direction.

Further, the flow chart shown in FIG. 11 and the like do not limit the present disclosure to the procedure shown in the above described flow, but the procedure may be added or deleted or the procedure order may be changed within the scope which does not deflect from the spirit and the technical concept of the present disclosure.

Further, the method according to the above described embodiment and each of the modified examples may be appropriately combined and utilized in addition to the structures which are mentioned above.

What is claimed is:

1. A non-transitory computer-readable recording medium storing a template processing program for executing steps on a computer unit of an operation terminal connected to a print label producing apparatus that has a feeder configured to feed a print-receiving medium and a printing head configured to perform desired printing on said print-receiving medium fed by said feeder and that is configured to produce a print label by using a template which includes arrangement information of each of print objects so as to allocate the print objects according to a predetermined mode wherein the arrangement information includes a plurality of print data each having an entity data other than text, and the operation terminal being connected to a template server for storing said template so as to enable information transmission and reception and including an operation unit and said computer unit, said steps comprising:

an editing accepting step for accepting an editing operation of said template via said operation unit;

a template producing step for producing said template including at least one said print object in response to the editing operation accepted in said editing accepting step;

a search target setting step for accepting, via said operation unit, a setting whether or not said at least one print object included in said template produced in said template producing step is set to a key word search target after being stored in said template server;

a keyword generating step for generating at least one keyword by image recognition analysis to the entity data as image data or by reverse coding to the entity data being encoded, the keyword being extracted from the print object to be set to the key word search target among said at least one print object included in said template produced in said template producing step, and that expresses text contents of the print object, on the basis of the setting accepted in said search target setting step; and a template transmission step for transmitting to said template server and storing therein said template that is produced in said template producing step, in association with said keyword that is generated in said keyword generating step.

2. The recording medium according to claim 1, said steps further comprise:

a keyword display step for selectably displaying, on said display unit, said keyword being generated in said keyword generating step; and a keyword selection step for accepting a selection operation of said keyword via said operation unit, on the basis of a display of said display unit in said keyword display step, wherein in said template transmission step, said keyword selected in said keyword selection step is transmitted to said template server and stored therein, in association with said template that is produced in said template producing step.

3. The recording medium according to claim 2, wherein in a case that a plurality of said templates is produced:

said editing accepting step and said template producing step are individually executed on each of said plurality of templates;

said search target setting step is executed only on one said template that is first produced among said plurality of templates; and said keyword extracted from the print object to be set to the search target is generated on each of said plurality of templates, on the basis of the setting in said search target setting step that is executed only on said first one template, in said keyword generating step.

4. A template processing method executed by an operation terminal connected to a print label producing apparatus that has a feeder configured to feed a print-receiving medium, and a printing head configured to perform desired printing on said print-receiving medium fed by said feeder and that is configured to produce a print label by using a template which includes arrangement information of each of print objects so as to allocate the print objects according to a predetermined mode wherein the arrangement information includes a plurality of print data each having an entity data other than text, and the operation terminal being connected to a template server for storing said template so as to enable information transmission and reception and including an operation unit and a computer unit, the template processing method comprising:

an editing accepting step for accepting an editing operation of said template via said operation unit;

a template producing step for producing said template including at least one said print object having text relevant data that is associated with text contents in response to the editing operation accepted in said editing accepting step and is constituted by a predetermined data format;

a search target setting step for accepting, via the operation unit, a setting whether or not said at least one print object included in said template produced in said template producing step is set to a search target after being stored in said template server;

a keyword generating step for generating at least one keyword by image recognition analysis to the entity data as image data or by reverse coding to the entity data being encoded, the keyword being extracted from the print object to be set to the search target among said at least one print object included in said template produced in said template producing step, and that expresses text contents of said text relevant data, on the basis of the setting accepted in said search target setting step; and a template transmission step for transmitting to said template server and storing therein said template that is produced in said template producing step, in association with keyword that is generated in said keyword generating step.

\* \* \* \* \*